No. 895,984. PATENTED AUG. 11, 1908.
JOHN DUCHAN, ROLAND DUCHAN & JOHANN DUCHAN.
PNEUMATIC HUB.
APPLICATION FILED MAR. 16, 1907.
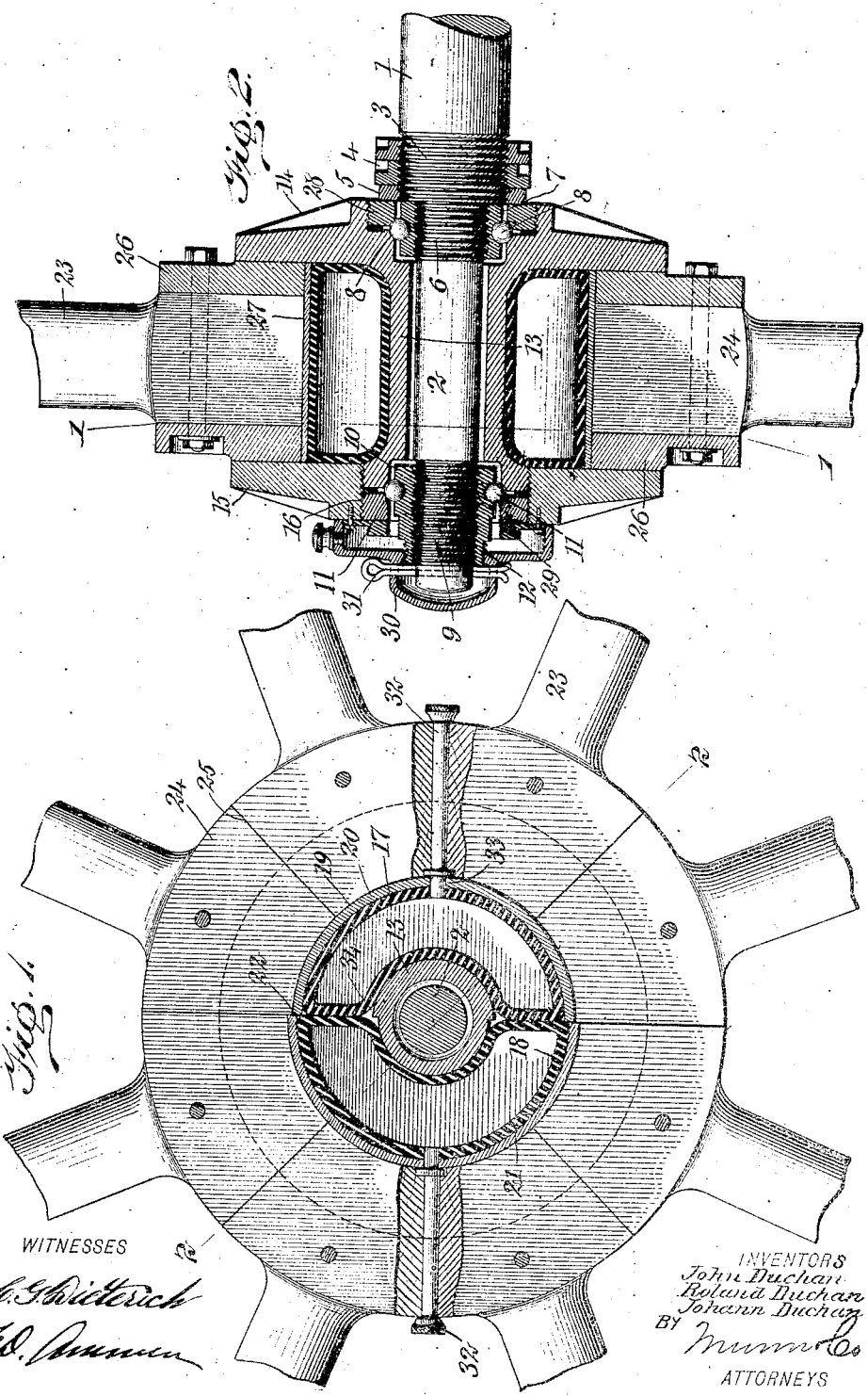
WITNESSES
INVENTORS
John Duchan
Roland Duchan
Johann Duchan
BY
ATTORNEYS

UNITED STATES PATENT OFFICE.

JOHN DUCHAN, OF ELIZABETHPORT, NEW JERSEY, AND ROLAND DUCHAN AND JOHANN DUCHAN, OF VIENNA, AUSTRIA-HUNGARY.

PNEUMATIC HUB.

No. 895,984.

Specification of Letters Patent.

Patented Aug. 11, 1908.

Application filed March 16, 1907. Serial No. 362,662.

*To all whom it may concern:*

Be it known that we, JOHN DUCHAN, a citizen of the United States, and a resident of Elizabethport, in the county of Union and State of New Jersey; ROLAND DUCHAN, a resident of Gumpoldskirchen bei Wien, Vienna, Austria, and JOHANN DUCHAN, a resident of Baden bei Wien, Vienna, Austria, both subjects of the Emperor of Austria, have invented a new and Improved Pneumatic Hub, of which the following is a full, clear, and exact description.

This invention relates to the hubs of vehicles; the object of the invention being to provide a pneumatic hub which will be simply constructed with a view to enabling the pneumatic cushion to be readily removed or replaced when desired.

The invention is expected to be especially useful in connection with automobiles and similar vehicles.

The invention consists in the construction and combination of parts to be more fully described hereinafter and particularly set forth in the claims.

Reference is to be had to the accompanying drawings forming a part of this specification, in which similar characters of reference indicate corresponding parts in both the figures, in which Figure 1 is a side elevation of a wheel hub showing an end plate therefor removed, the inner parts of the hub being represented in cross section or broken away; this view may be considered a section on the line 1—1 of Fig. 2; and Fig. 2 is a longitudinal central section of the hub shown in Fig. 1, and this view may be considered as a section on the line 2—2 of Fig. 1.

Referring more particularly to the parts, 1 represents an axle of any suitable form, the extremity thereof being formed into a spindle or arm 2 of reduced diameter. Near the point of connection between this spindle 2 and the axle 1, the axle is provided with threads 3 for the attachment of check nuts 4, which check nuts hold in position a collar 5; the purpose of which collar will appear more fully hereinafter. On the inner end of the spindle 2 we provide threads 6 which facilitate the attachment of a ball ring 7. The outer face of this ball ring is formed into a raceway for balls 8. The outer extremity of the spindle 2 is provided with similar threads 9 for the attachment of a ball ring 10, which ball ring is similarly provided with a ball race for balls 11. The outer extremity of the ball ring 10 is of reduced diameter as shown, and provided with threads 12 for a purpose which will appear more fully hereinafter.

Rotatably mounted on the spindle 2, we provide a sleeve 13, which sleeve has a reduced cylindrical neck which connects enlarged heads 14 and 15. The head 14 is made integral with the neck while the head 15 is attached by screw threads 16, as indicated. In the space immediately surrounding the neck of the sleeve and between the heads 14 and 15, we provide a pneumatic cushion consisting of two distinct pneumatic pads or cushions 17 and 18. These pads are of substantially semi-circular form as shown in Fig. 1, their ends being arranged abutting against each other as indicated. One of the pads is preferably of slightly larger diameter than the other, so that at its extremities it overlaps or projects beyond the opposite pad so as to present shoulders as shown. These pneumatic cushions are enveloped in a cylindrical case 19, which consists of two similar tubular sections 20 and 21. These tubular sections correspond in diameter to the pads to which they are applied, so that the ends 22 of the smaller section abut against the ends of the pad 18.

The spokes 23 of the wheel are all formed into heads 24, the side faces 25 of which abut against each other as shown in Fig. 1, and these heads are all bolted or secured between guide plates 26 as indicated in Fig. 2. The outer faces of these side plates 26 lie against the inner faces of the heads 14 and 15, making a sliding fit therewith, as will be readily understood. The inner faces of the heads 24 are concave to fit the curvature of the sections 20 and 21, so that the wheel may be considered as formed with a cylindrical chamber 27, within which the pneumatic cushions are received.

The sleeve 13 is mounted to rotate on the balls, the balls being held in position by retaining rings 28 and 29 applied as shown. To the outer face of the removable head 15, there is attached an oil cap 30 which is provided with openings to receive a split pin 31 which passes through the end of the spindle and retains the ball ring 10, as will be readily understood. The oil cap 30 acts as a hub nut to assist in retaining the wheel on the arm, the inner face of the hub being received against the head 15 aforesaid. The cushions 17 and 18 are adapted to be inflated by nipples 32 which pass in through the side of the hub and through openings 33 formed in the case 19.

The wall of the sleeve 13 on one side of a diameter is thickened as indicated, so that two longitudinally disposed shoulders 34 are formed. These shoulders tend to prevent a rotation of the cushions about the sleeve and assist the tubular shell 19 in this respect. In this connection attention is drawn to the fact that the bore of the hub which fits to the tubular section 21 is enlarged so that shoulders are formed in the wooden hub against which the edges of the case section 21 abut. Hence it is impossible for the case 19 to rotate in the hub.

With a wheel constructed as described evidently any shock at the rim of the wheels will be absorbed by the pneumatic cushion, and in this connection it should be understood that the hub of the wheel is freely movable between the guide heads 14 and 15.

Having thus described our invention, we claim as new and desire to secure by Letters Patent:

1. In a wheel, in combination, a hub having a bore, a tubular case received in said bore and presenting a projection on the inner side thereof, a sleeve, and a pair of pneumatic pads disposed around said sleeve and filling the space between said sleeve and said case, said projection affording means for preventing the rotation of said pads relative to said case.

2. In a wheel, in combination, a hub having a bore with an enlarged part and a reduced part, a sleeve consisting of an enlarged section received in said enlarged part of said bore and a reduced section received in said reduced part of said bore, a sleeve, and pneumatic pads disposed around said sleeve and filling the space between said case and said sleeve.

In testimony whereof I have signed my name to this specification in the presence of two subscribing witnesses.

JOHN DUCHAN.

Witnesses:
 JOHN AUER,
 HENRY FUCHS.

In testimony whereof I have signed my name to this specification in the presence of two subscribing witnesses.

ROLAND DUCHAN.

Witnesses:
 ALVESTO S. HOGUE,
 AUGUST FUGGER.

In testimony whereof I have signed my name to this specification in the presence of two subscribing witnesses.

JOHANN DUCHAN.

Witnesses:
 ALVESTO S. HOGUE,
 AUGUST FUGGER.